US011721804B2

(12) United States Patent
Liu et al.

(10) Patent No.: US 11,721,804 B2
(45) Date of Patent: Aug. 8, 2023

(54) CARBON-COATED LITHIUM IRON PHOSPHATE POSITIVE ACTIVE MATERIAL, METHOD FOR PREPARING SAME, POSITIVE ELECTRODE PLATE CONTAINING SAME, AND LITHIUM-ION BATTERY

(71) Applicant: CONTEMPORARY AMPEREX TECHNOLOGY CO., LIMITED, Ningde (CN)

(72) Inventors: Hongyu Liu, Ningde (CN); Changfeng Bie, Ningde (CN); Xue Leng, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/938,930

(22) Filed: Sep. 6, 2022

(65) Prior Publication Data
US 2023/0062063 A1     Mar. 2, 2023

Related U.S. Application Data

(63) Continuation of application No. PCT/CN2021/114071, filed on Aug. 23, 2021.

(51) Int. Cl.
| | |
|---|---|
| *H01M 4/36* | (2006.01) |
| *H01M 4/587* | (2010.01) |
| *H01M 4/133* | (2010.01) |
| *H01M 4/136* | (2010.01) |

(Continued)

(52) U.S. Cl.
CPC ............ *H01M 4/366* (2013.01); *C01B 25/45* (2013.01); *H01M 4/133* (2013.01); *H01M 4/136* (2013.01);

(Continued)

(58) Field of Classification Search
CPC ...... H01M 4/366; H01M 4/5825; C01B 25/45
See application file for complete search history.

(56) References Cited

U.S. PATENT DOCUMENTS

2020/0287209 A1\*    9/2020   Oono .................... H01M 4/382

FOREIGN PATENT DOCUMENTS

| CN | 101172599 A | 5/2008 |
|---|---|---|
| CN | 102437311 A | 5/2012 |

(Continued)

OTHER PUBLICATIONS

The World Intellectual Property Organization (WIPO) International Search Report and Written Opinion for PCT/CN2021/114071 dated Apr. 24, 2022 15 pages (with translation).

*Primary Examiner* — Nathanael T Zemui
(74) *Attorney, Agent, or Firm* — Anova Law Group, PLLC

(57) ABSTRACT

A positive active material made of carbon-coated lithium iron phosphate includes a lithium iron phosphate substrate, and a carbon coating layer on a surface of the substrate. The lithium iron phosphate substrate has a general structural formula $LiFe_{1-a}M_aPO_4$, where M is at least one selected from Cu, Mn, Cr, Zn, Pb, Ca, Co, Ni, Sr, Nb, or Ti, and $0 \le a \le 0.01$. A carbon coating factor of the carbon-coated lithium iron phosphate, $$\eta = \frac{BET1}{BET2},$$

satisfies $0.81 \le \eta \le 0.95$, where BET1 denotes a specific surface area of mesopore and macropore structures in the (Continued)

carbon-coated lithium iron phosphate, and BET2 denotes a total specific surface area of the carbon-coated lithium iron phosphate.

19 Claims, 4 Drawing Sheets

(51) Int. Cl.
    *H01M 10/0525*     (2010.01)
    *C01B 25/45*     (2006.01)
    *H01M 4/58*     (2010.01)
    *H01M 4/02*     (2006.01)

(52) U.S. Cl.
CPC ......... *H01M 4/587* (2013.01); *H01M 4/5825* (2013.01); *H01M 10/0525* (2013.01); *C01P 2002/54* (2013.01); *C01P 2004/04* (2013.01); *C01P 2004/61* (2013.01); *C01P 2004/62* (2013.01); *C01P 2004/80* (2013.01); *C01P 2006/11* (2013.01); *C01P 2006/12* (2013.01); *C01P 2006/40* (2013.01); *H01M 2004/021* (2013.01); *H01M 2004/028* (2013.01); *H01M 2220/20* (2013.01)

(56) References Cited

FOREIGN PATENT DOCUMENTS

| | | |
|---|---|---|
| CN | 107845792 A | 3/2018 |
| KR | 20130117023 A | 10/2013 |

* cited by examiner

CARBON-COATED LITHIUM IRON PHOSPHATE POSITIVE ACTIVE MATERIAL, METHOD FOR PREPARING SAME, POSITIVE ELECTRODE PLATE CONTAINING SAME, AND LITHIUM-ION BATTERY

CROSS-REFERENCE TO RELATED APPLICATION

This application is a continuation of International Application No. PCT/CN2021/114071, filed on Aug. 23, 2021, the entire content of which is incorporated herein by reference.

TECHNICAL FIELD

This application relates to the electrochemical field, and in particular, to a carbon-coated lithium iron phosphate positive active material, a method for preparing same, a positive electrode plate containing same, a lithium-ion battery, a battery module, a battery pack, and an electrical device.

BACKGROUND

With the rapid development of the new energy field, by virtue of advantages such as excellent electrochemical performance, no memory effect, and low environmental pollution, lithium-ion batteries are widely applied in various large-sized power devices, energy storage systems, and various consumer products, and especially, in the field of new energy vehicles such as battery electric vehicles and hybrid electric vehicles.

Among positive active materials commonly used in the lithium-ion batteries, lithium iron phosphate is one of the most widely used positive active materials in the currently industrialized lithium-ion batteries. However, because a gram capacity of lithium iron phosphate is lower than that of ternary materials, people have focused their research and development interest on exertion of the capacity of lithium iron phosphate in recent years. However, stressing the improvement of the capacity performance of lithium iron phosphate alone will inevitably impair other performance indicators of the battery, such as cycle performance and processability.

Therefore, it is expected to design a lithium-ion battery that is excellent in energy density, cycle performance, and processability concurrently.

SUMMARY

In view of the problems in the background technology, an objective of this application is to provide a carbon-coated lithium iron phosphate positive active material. The material is characterized by a high degree of capacity exertion, a high compaction density, and ease of dehydration of an electrode plate, enables a lithium-ion battery to be excellent in energy density, cycle performance, and processability concurrently, and can significantly improve production efficiency of batteries and reduce production cost of the batteries.

A first aspect of this application provides a carbon-coated lithium iron phosphate positive active material. The positive active material includes a lithium iron phosphate substrate and a carbon coating layer located on a surface of the substrate. The lithium iron phosphate substrate is expressed as a general structural formula $LiFe_{1-a}M_aPO_4$, where M is at least one selected from Cu, Mn, Cr, Zn, Pb, Ca, Co, Ni, Sr, Nb, or Ti, and $0 \leq a \leq 0.01$. A carbon coating factor of the carbon-coated lithium iron phosphate material is $$\eta = \frac{BET1}{BET2},$$

where BET1 is a specific surface area of mesopore and macropore structures in the carbon-coated lithium iron phosphate, BET2 is a total specific surface area of the carbon-coated lithium iron phosphate, and η satisfies $0.81 \leq \eta \leq 0.95$.

In any embodiment, η optionally satisfies $0.85 \leq \eta \leq 0.93$, and further optionally $0.88 \leq \eta \leq 0.92$.

In any embodiment, a value range of BET1 is 5.5 to 9.5 $m^2/g$, and a value range of BET2 is 6.0 to 11.5 $m^2/g$.

In any embodiment, a ratio H/D of a thickness H of the carbon coating layer to an average particle diameter D of the carbon-coated lithium iron phosphate is 0.01 to 0.04.

In any embodiment, a carbon component in the carbon coating layer accounts for 0.7% to 1.3% of a total mass of the lithium iron phosphate positive active material, optionally 0.9% to 1.3%, and further optionally 0.9% to 1.1%.

In any embodiment, a volume median diameter $D_{v50}$ of the carbon-coated lithium iron phosphate satisfies 840 nm $\leq D_{v50} \leq$ 3570 nm, and optionally 1170 nm $\leq D_{v50} \leq$ 1820 nm.

In any embodiment, a powder compaction density of the carbon-coated lithium iron phosphate is at least 2.4 $g/cm^3$, optionally 2.5 $g/cm^3$, and further optionally 2.6 $g/cm^3$.

In any embodiment, a graphitization degree of the carbon-coated lithium iron phosphate is 0.15 to 0.32, and optionally 0.19 to 0.26.

In any embodiment, a powder resistivity of the carbon-coated lithium iron phosphate is not greater than 60 Ω·m, optionally not greater than 30 Ω·m, and further optionally not greater than 20 Ω·m.

A second aspect of this application provides a method for manufacturing the positive active material disclosed in the first aspect of this application. The method includes the following steps:

providing the lithium iron phosphate substrate; and performing carbon coating on the lithium iron phosphate substrate to obtain the positive active material. The positive active material includes a lithium iron phosphate substrate and a carbon coating layer located on a surface of the substrate. The lithium iron phosphate substrate is expressed as a general structural formula $LiFe_{1-a}M_aPO_4$, where M is at least one selected from Cu, Mn, Cr, Zn, Pb, Ca, Co, Ni, Sr, Nb, or Ti, and $0 \leq a \leq 0.01$. A carbon coating factor of the carbon-coated lithium iron phosphate material is $$\eta = \frac{BET1}{BET2},$$

where BET1 is a specific surface area of mesopore and macropore structures in the carbon-coated lithium iron phosphate, BET2 is a total specific surface area of the carbon-coated lithium iron phosphate, and η satisfies $0.81 \leq \eta \leq 0.95$.

In any embodiment, the method for preparing the positive active material includes the following steps:

(1) providing the lithium iron phosphate substrate, where the lithium iron phosphate substrate is obtained by treating a mixture at a high temperature in an inert atmosphere, and the mixture is obtained by mixing ingredients of a Fe source, a Li source, an M source, and/or P source with a reagent that serves as a reductant and a carbon source; and (2) performing carbon coating on the lithium iron phosphate substrate by treating the lithium iron phosphate substrate at a high temperature in an inert atmosphere while spraying the carbon source concurrently, so that a carbon-coated lithium iron phosphate material is obtained by chemical vapor deposition.

The Fe source may be one or more selected from $FeSO_4$, $FePO_4$, $FeCl_2$, $FeC_2O_4$, or $Fe_2O_3$.

The Li source may be one or more selected from $Li_2CO_3$, $LiH_2PO_4$, or $Li_3PO_4$.

The P source may be one or more selected from $NH_4H_2PO_4$ or $H_3PO_4$. The M source includes an element selected from Cu, Mn, Cr, Zn, Pb, Ca, Co, Ni, Sr, Nb, or Ti.

The reagent that serves as a reductant and a carbon source in step (1) may be one or more selected from $C_2H_2$, $CH_4$, glucose, polyethylene glycol, sucrose, starch, $H_2$, or CO. Optionally, a dosage of the reagent that serves as a reductant and a carbon source accounts for 4% to 8%, and optionally 6%, of a total mass of the ingredients.

The carbon source in step (2) may be a material such as acetone.

A treatment temperature in step (1) or (2) may vary within a wide range, for example, 500 to 800° C.

A third aspect of this application provides a positive electrode plate of a lithium-ion battery, including a positive current collector and a positive active material disposed on at least one surface of the positive current collector. The positive active material is the positive active material according to the first aspect of this application or the positive active material prepared by the method according to the second aspect of this application.

In any embodiment, a saturated water content of the positive electrode plate at 25° C. and a relative humidity of 45% is not greater than 500 ppm.

A fourth aspect of this application provides a lithium-ion battery. The lithium-ion battery includes a positive electrode plate and a negative electrode plate. The positive electrode plate includes a positive current collector and a positive active material disposed on at least one surface of the positive current collector. The positive active material is the positive active material according to the first aspect of this application or the positive active material prepared by the method according to the second aspect of this application. The saturated water content of the positive electrode plate at 25° C. and a relative humidity of 45% is not greater than 500 ppm.

In any embodiment, an electrode compaction density of the positive electrode plate is at least 2.35 $g/cm^3$, and an electrode compaction density of the negative electrode plate is at least 1.6 $g/cm^3$. A negative active material in the negative electrode plate is graphite coated with amorphous carbon.

A fifth aspect of this application provides a battery module, including the lithium-ion battery according to the fourth aspect of this application. The preparation method of the battery module may be a method known in the related art for preparing the battery module.

A sixth aspect of this application provides a battery pack, including the lithium-ion battery according to the fourth aspect of this application or the battery module according to the fifth aspect of this application. The preparation method of the battery pack may be a method known in the related art for preparing the battery pack.

A seventh aspect of this application provides an electrical device, including the lithium-ion battery according to the fourth aspect of this application, the battery module according to the fifth aspect of this application, or the battery pack according to the sixth aspect of this application. The lithium-ion battery or the battery module or the battery pack is used as a power supply of the electrical device or an energy storage unit of the electrical device. The preparation method of the electrical device may be a method known in the related art for preparing the electrical device.

This application achieves at least the following beneficial effects:

This application obtains the positive active material hereof by adjusting a relative percentage of a specific surface area of carbon structures of each different micromorphology in a superficial layer of a carbon-coated lithium iron phosphate material. The carbon-coated lithium iron phosphate material according to this application possesses a carbon coating factor η. When η satisfies 0.81≤η≤0.95, the carbon-coated lithium iron phosphate contains a high-quality carbon coating, and overcomes a process bottleneck of difficulty of electrode plate dehydration to a great extent. The lithium-ion battery prepared from such a material is excellent in energy density, cycle performance, and processability concurrently.

The battery module, the battery pack, and the electrical device according to this application each contain the lithium-ion battery according to this application, and therefore, have at least the same advantages as the lithium-ion battery.

REFERENCE NUMERALS

Figure 1:
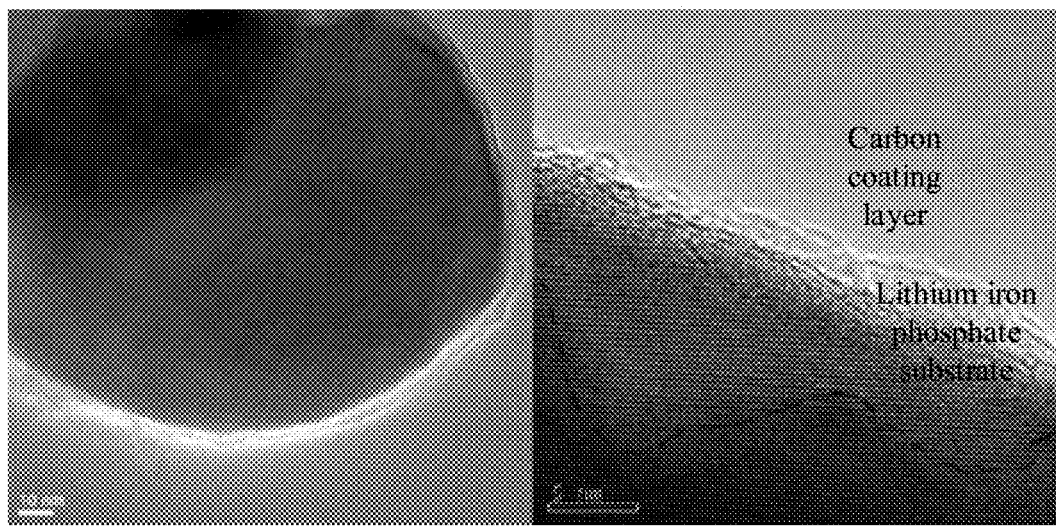
FIG. 1 is a transmission electron microscopy (TEM) image of a carbon-coated lithium iron phosphate positive active material at different magnifications according to an embodiment of this application.

1. Battery pack;
2. Upper box;
3. Lower box;
4. Battery module;
5: Lithium-ion battery;
51. Housing;
52. Electrode assembly;
53. Cap assembly.

DETAILED DESCRIPTION OF EMBODIMENTS

The following describes in detail and specifically discloses a carbon-coated lithium iron phosphate positive active material, a method for preparing same, a positive electrode plate containing same, a lithium-ion battery, a battery module, a battery pack, and an electrical device according to this application with reference to drawings. However, unnecessary details may be omitted in some cases. For example, detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this application, but not intended to limit the subject-matter set forth in the claims.

For brevity, this application specifically discloses some numerical ranges. Various numerical ranges may be combined with each other to form corresponding implementation solutions. Any lower limit may be combined with any upper limit to form a range according to this application, any lower limit may be combined with any other lower limit to form a range according to this application, and any upper limit may be combined with any other upper limit to form a range according to this application. In addition, each separately disclosed point or single numerical value may be used as a lower limit or upper limit to combine with any other point or other single numerical value or with any other lower or upper limit to form a range according to this application.

Unless otherwise specified, the terms used in this application have the well-known meanings commonly understood by a person skilled in the art. In this application, unless otherwise specified, a number modified by "at least" or "less than or equal to" represents a range inclusive of this number. For example, "at least one of a or b" means a alone, b alone, or both a and b. Similarly, the phrase "one or more" is meant to include at least one. In the description herein, unless otherwise specified, the term "or" is meant to be inclusive. That is, the phrase "A or B" means "A alone, B alone, or both A and B".

It is hereby noted that the term "carbon coating layer" means a part that coats a lithium iron phosphate substrate, where the part may fully coat, but not necessarily fully coat, the lithium iron phosphate substrate. The use of the phrase "carbon coating layer" herein is merely intended for ease of description, but not to limit this application. Similarly, the term "thickness of the carbon coating layer" means a maximum thickness of the part that coats the lithium iron phosphate substrate.

Based on research on the lithium iron phosphate positive active material, the inventor hereof finds that the low electronic conductivity and low ionic conductivity of pure-phase lithium iron phosphate positive active material (containing no carbon) deteriorate the exertion of capacity of the lithium iron phosphate positive active material, and make a sharp difference in energy density between a lithium-ion battery using lithium iron phosphate as a positive active material and a ternary lithium-ion battery.

To solve the problem of low electronic conductivity and low ionic conductivity of the lithium iron phosphate positive active material, the material may be subjected to a carbon coating process and nanometerization. However, the inventor hereof finds that both the carbon coating process and the nanometerization inevitably deteriorate other performance indicators of the battery, especially deteriorate the cycle performance and processability of the battery.

In particular, during practical operation, the inventor hereof finds that, for the carbon-coated lithium iron phosphate material, different carbon coating processes give rise to pore structures of different micromorphologies existent in the positive active material, for example, micropore structure (network structures with pores smaller than 2 nm in diameter), mesopore structures (network structures with pores 2 nm to 50 nm in diameter), macropore structures (network structures with pores larger than 50 nm in diameter), and other structures without obvious pores, such as layered carbon structures. Based on a large number of experiments, the inventor finds that, for the carbon-coated lithium iron phosphate material, the unreasonable coordination between various pore structures in a superficial layer not only brings little effect on improving the electronic and ionic conductivity of the lithium iron phosphate positive active material, but also significantly increases the difficulty of dehydration of an electrode plate made of the lithium iron phosphate positive active material. Consequently, even if the electrode plate made of the material has been dehydrated for a long time, the dehydration rate fails to meet the requirements of batteries. Especially, when the coating thickness of the positive active material layer is increased in order to increase the energy density of the battery, the dehydration rate of the electrode plate is more incapable of meeting the requirements.

In particular, during practical operation, the inventor further finds that the nanometerization also increases the difficulty of dehydration of the electrode plate, thereby deteriorating the cycle performance of the battery. In addition, the nanometerization reduces the powder compaction density of the lithium iron phosphate positive active material, so that the increase of energy density attributable to the improvement of the electronic and ionic conductivity is compromised drastically.

On the one hand, the excessive water in the electrode plate leads to problems such as easy detachment of a positive film layer from the electrode plate and unstable structure and chemical properties, thereby ultimately impairing the cycle performance of the battery. On the other hand, the excessive water increases the risks of producing substandard products during manufacture of the battery, thereby not only increasing cost but also affecting production efficiency severely.

To sum up, it is expected to develop a positive active material characterized by a high degree of capacity exertion, a high compaction density, and easy dehydration of the electrode plate, and in turn, design a lithium-ion battery that is excellent in energy density, cycle performance, and processability concurrently.

Based on a lot of experiments and researches, the inventor hereof finds a technical solution to making the lithium iron phosphate positive active material exhibit a high degree of capacity exertion, a high compaction density, and ease of dehydration of an electrode plate, enabling a lithium-ion battery to be excellent in energy density, cycle performance, and processability concurrently, and significantly improving production efficiency of batteries and reduce production cost of the batteries.

[Carbon-Coated Lithium Iron Phosphate Positive Active Material]

This application provides a carbon-coated lithium iron phosphate positive active material. The positive active material includes a lithium iron phosphate substrate and a carbon coating layer located on a surface of the substrate. The lithium iron phosphate substrate is expressed as a general structural formula $LiFe_{1-a}M_aPO_4$, where M is at least one selected from Cu, Mn, Cr, Zn, Pb, Ca, Co, Ni, Sr, Nb, or Ti, and $0 \leq a \leq 0.01$.

A carbon coating factor of the carbon-coated lithium iron phosphate material is $$\eta = \frac{BET1}{BET2},$$

where BET1 is a specific surface area of mesopore and macropore structures in the carbon-coated lithium iron phosphate, BET2 is a total specific surface area of the carbon-coated lithium iron phosphate, and η satisfies 0.81≤η≤0.95.

The substrate is expressed as a general structural formula $LiFe_{1-a}M_aPO_4$, where M is at least one selected from Cu, Mn, Cr, Zn, Pb, Ca, Co, Ni, Sr, Nb, or Ti, and 0≤a≤0.01. The doping with the M element helps to improve structural stability of the lithium iron phosphate substrate and prevent structural collapse of the lithium iron phosphate positive active material after several charge-and-discharge cycles.

The carbon coating layer improves the electronic and ionic conductivity, and improves the energy density of the battery. However, as a porous structure formed of carbon, the carbon coating layer significantly increases an overall specific surface energy of the lithium iron phosphate positive active material, thereby significantly increasing hygroscopicity of the lithium iron phosphate positive active material. Based on a large number of experiments, the inventor hereof finds that, when the carbon-coated lithium iron phosphate material satisfies $$\eta = \frac{BET1}{BET2},$$

where 0.81≤η≤0.95, the carbon-coated lithium iron phosphate possesses a reasonable specific surface energy on the basis of a high degree of capacity exertion, thereby significantly reducing the overall specific surface energy of the electrode plate made of the carbon-coated lithium iron phosphate positive active material, significantly improving the dehydration efficiency of the electrode plate, and overcoming the process bottleneck of difficulty of electrode plate dehydration to a great extent. Therefore, a battery prepared from the carbon-coated lithium iron phosphate positive active material that satisfies 0.81≤η≤0.95 is excellent in energy density, cycle performance, and processability concurrently.

In this application, the carbon coating factor η actually represents a relative percentage of a specific surface area attributable to pore structures of each different micromorphology in the carbon-coated lithium iron phosphate material, and can reflect a percentage of a specific surface area of micropore structures that contribute greatly to the surface energy in a specific surface area attributable to all pores. The percentage reflects effectiveness of the lithium iron phosphate carbon coating layer. Based on a lot of experimental exploration and long-term experience in the preparation of positive electrode materials, the inventor finds that, when 0.81≤η≤0.95 is satisfied, the dense and efficient carbon coating layer not only significantly improves the degree of capacity exertion of the lithium iron phosphate positive active material, but also significantly reduces the surface energy of the lithium iron phosphate positive active material, thereby enabling the lithium-ion battery to achieve significantly improved cycle performance and processability on the basis of achieving an excellent energy density.

Based on a lot of experimental exploration, the inventor finds that, when the carbon coating factor η falls within the range of 0.85≤η≤0.93, the relative percentage of pores of each different micromorphology in the superficial layer falls within a more reasonable range, and the lithium iron phosphate contains a high-quality carbon coating, thereby helping to exert the capacity of the lithium iron phosphate positive active material, and significantly reducing the water absorption amount of the electrode plate. A lithium-ion battery prepared from such a material is excellent in energy density, cycle performance, and processability concurrently.

In some embodiments, optionally, the range of η is 0.88≤η≤0.92, thereby achieving higher electrochemical performance and processability of the lithium-ion battery.

To sum up, this application obtains the carbon-coated lithium iron phosphate positive active material by adjusting a relative percentage of a specific surface area of carbon structures of each different micromorphology in a superficial layer of a carbon-coated lithium iron phosphate material. When the carbon coating factor η of the carbon-coated lithium iron phosphate material according to this application satisfies 0.81≤η≤0.95, the lithium iron phosphate material contains a high-quality carbon coating, thereby helping to significantly improve the dehydration efficiency of the electrode plate. The lithium-ion battery prepared from such a material is excellent in energy density, cycle performance, and processability concurrently. For details, refer to Table 1.

Optionally, the value of η may be 0.811, 0.836, 0.862, 0.894, 0.915, 0.922, 0.928, 0.939, or fall within a range formed by any two thereof.

In some embodiments, optionally, the value of BET1 ranges from 5.5 to 9.5 $m^2/g$, and the value of BET2 ranges from 6.0 to 11.5 $m^2/g$. In this case, the relative percentage of carbon structures of each different micromorphology in the superficial layer falls within a more reasonable range, and the electrode plate is prevented from absorbing water easily, thereby being more conducive to improving the energy density and cycle performance of the battery.

Optionally, the value of BET1 may be 9.08, 8.86, 7.05, 6.68, 6.93, 6.46, 5.95, 5.82, or fall within a range formed by any two thereof. The value of BET2 may be 11.2, 10.6, 8.19, 7.48, 7.16, 7.01, 6.40, 6.20, or fall within a range formed by any two thereof.

In some embodiments, optionally, a ratio H/D of a thickness H of the carbon coating layer to an average particle diameter D of the carbon-coated lithium iron phosphate in the positive active material according to this application is 0.01 to 0.04.

When the ratio of the thickness of the carbon coating layer to the average particle diameter of the carbon-coated lithium iron phosphate is 0.01 to 0.04, the integrity and electronic conductivity of the carbon coating layer on the surface of the lithium iron phosphate material are relatively high, and the material is of relatively high electronic conductivity. In addition, because the percentage of the thickness of the carbon coating layer in an overall size of particles falls within a reasonable range, the lithium iron phosphate material achieves a relatively high powder compaction density concurrently, thereby achieving a relatively high energy density and cycle performance of the lithium-ion battery. A reasonable thickness of the carbon coating layer also reduces the difficulty of dehydration of the electrode plate prepared from the lithium iron phosphate material, thereby helping to improve the processability.

In some embodiments, optionally, a carbon component accounts for 0.7% to 1.3% of a total mass of the carbon-coated lithium iron phosphate, optionally 0.9% to 1.3%, and further optionally 0.8% to 1.1%.

A deficient content of carbon leads to low integrity of the carbon coating layer on the surface of the lithium iron phosphate material, and low kinetics of the material, thereby resulting in a low energy density of the battery. An excessive content of carbon obstructs single particles from growing during sintering, and therefore, the lithium iron phosphate material tends to form secondary particles constructed of many small particles, and the carbon component does not contribute to the battery capacity, thereby also resulting in a low energy density of the lithium-ion battery. In this application, based on a total mass of the carb-coated lithium iron phosphate, the carbon content satisfies 0.7%≤C≤1.3%, optionally 0.9%≤C≤1.3%, and further optionally 0.8%≤C≤1.1%. For details, refer to Table 2.

Optionally, based on the total mass of the carbon-coated lithium iron phosphate, the content of the carbon component may be 0.70%, 0.82%, 0.95%, 1.12%, 1.3%, or fall within a range formed by any two thereof.

In some embodiments, optionally, a volume median diameter $D_{v50}$ of the carbon-coated lithium iron phosphate according to this application satisfies 840 nm≤$D_{v50}$≤3570 nm, and optionally 1170 nm≤$D_{v50}$≤1820 nm.

The inventor hereof finds that, to solve the problem of low electronic conductivity and low ionic conductivity of the lithium iron phosphate positive active material, the material may be subjected to nanometerization. However, after a lot of practice, the inventor finds that the nanometerization also increases the surface energy of the lithium iron phosphate positive active material, increases hygroscopicity of the electrode plate, leads to difficulty of dehydration, and in turn, deteriorates the cycle performance and processability of the battery. In addition, the nanometerization reduces the powder compaction density of the lithium iron phosphate positive active material, so that the increase of energy density attributable to the improvement of the electronic and ionic conductivity is compromised drastically.

Based on experiments, it is found that, when the range of 0.81≤η≤0.95 is satisfied, and when the carbon-coated lithium iron phosphate further satisfies the volume median diameter of 840 nm≤$D_{v50}$≤3570 nm, optionally 1170 nm≤$D_{v50}$≤1820 nm, the powder compaction density of the carbon-coated lithium iron phosphate is up to 2.64 g/cm³, and the compaction density of the electrode plate is up to 2.64 g/cm³. In this application, with the increase of the volume median diameter $D_{v50}$, both the powder compaction density and the electrode compaction density show a downward tendency, and the energy density of the battery declines gradually. However, with the increase of $D_{v50}$, the dehydration efficiency of the electrode plate is improved, and the cycle performance of the corresponding lithium-ion battery is improved to some extent. For details, refer to Table 4.

Optionally, the value of $D_{v50}$ may be 840, 1170, 1430, 1820, 3520, or fall within a range formed by any two thereof.

In some embodiments, optionally, a graphitization degree of the carbon-coated lithium iron phosphate according to this application is 0.15 to 0.32. When the carbon coating factor of the carbon-coated lithium iron phosphate material according to this application falls within a range of 0.81≤η≤0.95, and the graphitization degree of the carbon-coated lithium iron phosphate falls within a range of 0.15 to 0.32, such ranges are conducive not only to exerting the capacity of the lithium iron phosphate material, but also to improving the powder resistivity of the lithium iron phosphate material and increasing the energy density of the battery. For details, refer to Table 5.

The "graphitization degree" of the carbon-coated lithium iron phosphate means the degree of graphitization of the carbon component, and reflects the integrity of the graphite crystal structure in the carbon-coated lithium iron phosphate according to this application, especially in the carbon coating layer, that is, the degree of regularity of arrangement of carbon atoms in the graphite structure.

Optionally, the value of graphitization degree may be 0.155, 0.197, 0.255, 0.245, 0.312, or fall within a range formed by any two thereof.

In some embodiments, the lithium iron phosphate substrate is doped with carbon, optionally with 0.1 wt % to 0.5 wt % carbon based on a mass of the lithium iron phosphate substrate.

In some embodiments, optionally, a powder resistivity of the carbon-coated lithium iron phosphate according to this application is not greater than 60 Ω·m, optionally not greater than 30 Ω·m, and further optionally not greater than 20 Ω·m.

In some embodiments, optionally, the positive active materials according to this application include other conventional positive active materials in this field, for example, other olivine-structured lithium-containing phosphates and lithium transition metal oxides and modified compounds thereof in addition to the carbon-coated lithium iron phosphate. However, this application is not limited to such materials, and other conventional materials usable as a positive active material of a battery may be used instead. One of the positive active materials may be used alone, or at least two thereof may be combined and used together. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811)), lithium nickel cobalt aluminum oxide (such as $LiNi_{0.85}Co_{0.15}Al_{0.05}O_2$), or a modified compound thereof. Examples of other olivine-structured lithium-containing phosphate may include, but are not limited to, at least one of lithium manganese phosphate (such as $LiMnPO_4$), a composite of lithium manganese phosphate and carbon, lithium manganese iron phosphate, or a composite of lithium manganese iron phosphate and carbon.

[Positive Electrode Plate]

This application provides a positive electrode plate, including a positive current collector and a positive active material disposed on at least one surface of the positive current collector. The positive active material is the carbon-coated lithium iron phosphate according to one aspect of this application.

The lithium-ion battery according to this application includes a positive electrode plate and a negative electrode plate. The positive electrode plate includes the carbon-coated lithium iron phosphate positive active material according to this application. The saturated water content of the positive electrode plate at 25° C. and a relative humidity of 45% is not greater than 500 ppm. In the related art, the lithium iron phosphate positive active material is manufactured by means of conventional carbon coating. The saturated water content, at 25° C. and a relative humidity of 45%, of an electrode plate prepared from such a material, is up to 1000 ppm, which is significantly higher than the water absorption amount of the electrode plate prepared from the carbon-coated lithium iron phosphate positive active material according to this application.

In some embodiments, optionally, the electrode compaction density of the positive electrode plate according to this application is up to 2.65 g/cm$^3$, and the electrode compaction density of the negative electrode plate is at least 1.6 g/cm$^3$. A negative active material in the negative electrode plate is graphite coated with amorphous carbon.

In order to fit with the lithium iron phosphate positive active material with a high degree of capacity exertion according to this application, this application provides a graphite negative electrode that achieves a degree of capacity exertion of at least 350 mAh/g and an electrode compaction density of at least 1.6 g/cm$^3$. In addition, with the graphite surface coated with an amorphous carbon coating layer, the lithium ion intercalation capability fits with that of the positive electrode according to this application, and the state-of-charge (SOC) window is relatively wide.

In some embodiments, optionally, in the positive film layer of the positive electrode plate according to this application, the percent by mass of the carbon-coated lithium iron phosphate positive active material in the total mass of the entire positive film layer is 90% to 98%. In the carbon-coated lithium iron phosphate positive active material according to this application, the same content of binder can bind a larger amount of lithium iron phosphate positive active material due to the specific surface area contributed by the reasonable carbon structures of different micromorphologies added. With 2 wt % PVDF added in the positive film layer, when the coating amount is greater than or equal to 300 mg/mm$^2$, the coating speed in mass production is up to 60 m/min, thereby significantly improving the processing efficiency in practical operation and the energy density of the battery.

The positive electrode plate includes a positive current collector and a positive electrode material disposed on at least one surface of the positive current collector. As an example, the positive current collector includes two surfaces opposite to each other in a thickness direction thereof. The positive material is disposed on either or both of the two opposite surfaces of the positive current collector.

In the lithium-ion battery according to this application, the positive current collector may be a metal foil or a composite current collector. For example, the metal foil may be an aluminum foil. The composite current collector may include a polymer material base layer and a metal layer formed on at least one surface of the polymer material base layer. The composite current collector may be formed by overlaying a polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), 1,3-propane sultone (PS), or polyethylene (PE), but this application is not limited to such materials.

The positive electrode material further optionally includes a conductive agent. The type of the conductive agent is not specifically limited, and may be selected by a person skilled in the art according to practical needs. As an example, the conductive agent for use in the positive electrode material may be at least one selected from superconductive carbon, acetylene black, carbon black, Ketjen black, carbon dots, carbon nanotubes, graphene, or carbon nanofibers.

In this application, the positive electrode plate may be prepared according to a method known in the art. As an example, the preparation method includes: dispersing the positive active material according to this application, the conductive agent, and the binder in a solvent (such as N-methyl-pyrrolidone, NMP) to form a homogeneous positive slurry, coating a positive current collector with the positive slurry, and performing steps such as drying and cold pressing to obtain a positive electrode plate.

[Negative Electrode Plate]

The negative electrode plate includes a negative current collector and a negative film layer disposed on at least one surface of the negative current collector. The negative film layer includes a negative active material.

For example, the negative current collector includes two surfaces opposite to each other in a thickness direction thereof. The negative film layer is disposed on either or both of the two opposite surfaces of the negative current collector.

In some embodiments, optionally, the electrode compaction density of the positive electrode plate according to this application is at least 2.35 g/cm$^3$, and the electrode compaction density of the negative electrode plate is at least 1.6 g/cm$^3$. A negative active material in the negative electrode plate is graphite coated with amorphous carbon.

In order to fit with the lithium iron phosphate positive active material with a high degree of capacity exertion according to this application, this application provides a graphite negative electrode that achieves a degree of capacity exertion of at least 350 mAh/g and an electrode compaction density of at least 1.6 g/cm$^3$. In addition, with the graphite surface coated with an amorphous carbon coating layer, the lithium ion intercalation capability fits with that of the positive electrode according to this application, and the state-of-charge (SOC) window is relatively wide.

In the lithium-ion battery according to this application, the negative current collector may be a metal foil or a composite current collector. For example, the metal foil may be a copper foil. The composite current collector may include a polymer material base layer and a metal layer formed on at least one surface of the polymer material base layer. The composite current collector may be formed by overlaying a polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE), but this application is not limited to such materials.

In the negative electrode plate according to this application, the negative film layer generally includes a negative active material, an optional binder, an optional conductive agent, and other optional agents, and is generally formed by being coated with and drying a negative slurry. The negative slurry is generally formed by dispersing a negative active material, an optional conductive agent, a binder, and the like into a solvent and then stirring well. The solvent may be N-methyl-pyrrolidone (NMP) or deionized water.

As an example, the conductive agent may be at least one selected from superconductive carbon, acetylene black, carbon black, Ketjen black, carbon dots, carbon nanotubes, graphene, or carbon nanofibers.

In the negative electrode plate according to this application, the negative film layer optionally includes other commonly used negative active materials such as artificial graphite, natural graphite, soft carbon, hard carbon, silicon-based material, tin-based material, and lithium titanium oxide, in addition to the foregoing negative active material. The silicon-based material may be at least one selected from simple-substance silicon, silicon-oxygen compound, silicon-carbon composite, silicon-nitrogen composite, or silicon alloy. The tin-based material may be at least one selected from simple-substance tin, tin-oxygen compound, or tin alloy.

[Electrolytes]

The electrolyte serves to conduct ions between the positive electrode plate and the negative electrode plate. The type of the electrolyte is not specifically limited in this application, and may be selected as required. For example, the electrolyte may be at least one selected from a solid-state electrolyte or a liquid-state electrolyte (that is, electrolytic solution).

In some embodiments, the electrolyte is an electrolytic solution. The electrolytic solution includes an electrolyte salt and a solvent.

In some embodiments, the electrolyte salt may be at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluoro(oxalato) borate (LiDFOB), lithium bis(oxalato)borate (LiBOB), lithium difluorophosphate ($LiPO2F_2$), lithium difluoro(bisoxalato)phosphate (LiDFOP), or lithium tetrafluoro(oxalato)phosphate (LiTFOP).

In some embodiments, the solvent may be at least one selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl)ethane (ESE).

In some embodiments, the electrolytic solution further optionally includes an additive. For example, the additive may include a negative film-forming additive, a positive film-forming additive, and additives that can improve some performance of the battery, for example, an additive that improves overcharge performance of the battery, an additive that improves high-temperature performance of the battery, and an additive that improves low-temperature performance of the battery, and the like.

In some embodiments, optionally, the conductivity of the electrolytic solution according to this application is not less than 13 mS/cm, so as to fit with the positive electrode plate and the negative electrode plate according to this application.

[Separator]

A lithium-ion battery that employs an electrolytic solution and some lithium-ion batteries that employ a solid-state electrolyte further contain a separator. The separator is disposed between the positive electrode plate and the negative electrode plate to serve an isolation purpose. The type of the separator is not particularly limited in this application, and may be any well-known porous separator that is highly stable both chemically and mechanically. In some embodiments, the material of the separator may be at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

[Lithium-Ion Battery]

In some embodiments, the positive electrode plate, the negative electrode plate, and the separator may be wound or stacked to form an electrode assembly. The positive electrode plate includes the carbon-coated lithium iron phosphate according to this application.

In some embodiments, the lithium-ion battery may further include an outer package. The outer package may be configured to package the electrode assembly and the electrolyte.

In some embodiments, the outer package of the lithium-ion battery may be a hard shell such as a hard plastic shell, an aluminum shell, a steel shell, or the like. Alternatively, the outer package of the lithium-ion battery may be a soft package such as a pouch-type soft package. The material of the soft package may be plastic such as polypropylene (PP), polybutylene terephthalate (PBT), or polybutylene succinate (PBS).

Figure 2:
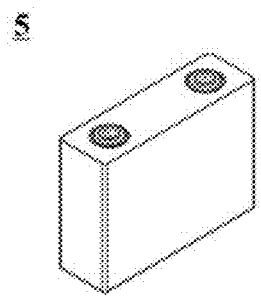
FIG. 2 is a schematic diagram of a lithium-ion battery according to an embodiment of this application.

The shape of the lithium-ion battery is not specifically limited in this application, and may be cylindrical, prismatic or any other shape. FIG. 2 shows a prismatic lithium-ion battery 5 as an example.

Figure 3:
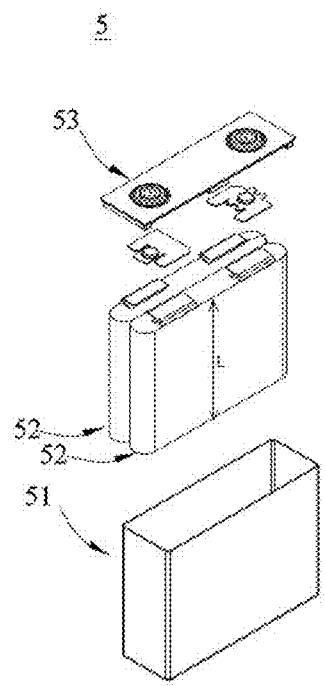
FIG. 3 is an exploded view of the lithium-ion battery shown in FIG. 2 according to an embodiment of this application.

In some embodiments, referring to FIG. 3, the outer package may include a housing 51 and a cover plate 53. The housing 51 may include a bottom plate and a side plate connected to the bottom plate. The bottom plate and the side plate close in to form an accommodation cavity. The housing 51 is provided with an opening that communicates with the accommodation cavity. The cover plate 53 can cover the opening to close the accommodation cavity. The positive electrode plate, the negative electrode plate, and the separator may be wound or stacked to form the electrode assembly 52. The electrode assembly 52 is packaged in the accommodation cavity. The electrolytic solution serves a function of infiltration in the electrode assembly 52. The number of electrode assemblies 52 in a lithium-ion battery 5 may be one or more, and may be selected by a person skilled in the art as specifically required.

[Battery Module]

In some embodiments, the lithium-ion battery may be assembled into a battery module. The battery module may include one or more lithium-ion batteries, and the specific number of lithium-ion batteries in a battery module may be selected by a person skilled in the art depending on practical applications and capacity of the battery module.

Figure 4:
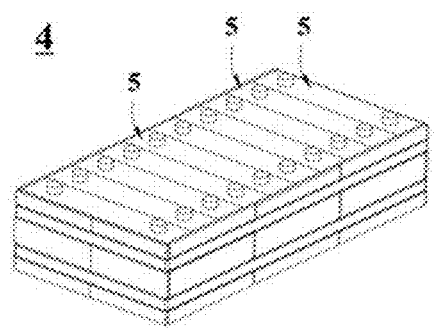
FIG. 4 is a schematic diagram of a battery module according to an embodiment of this application.

FIG. 4 shows a battery module 4 as an example. Referring to FIG. 4, in the battery module 4, a plurality of lithium-ion batteries 5 may be arranged sequentially along a length direction of the battery module 4. Alternatively, the secondary batteries may be arranged in any other manner. Further, the plurality of lithium-ion batteries 5 may be fixed by a fastener.

Optionally, the battery module 4 may further include a shell that provides an accommodation space. The plurality of lithium-ion batteries 5 are accommodated in the accommodation space.

[Battery Pack]

In some embodiments, the battery modules may be assembled into a battery pack. The number of battery modules contained in a battery pack may be selected by a person skilled in the art depending on practical applications and capacity of the battery pack.

Figure 5:
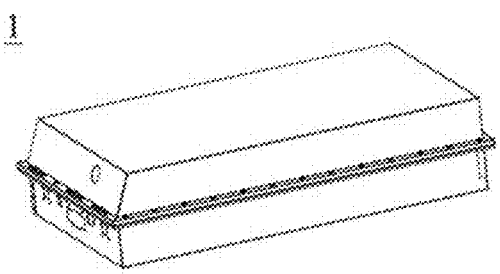
FIG. 5 is a schematic diagram of a battery pack according to an embodiment of this application.
Figure 6:
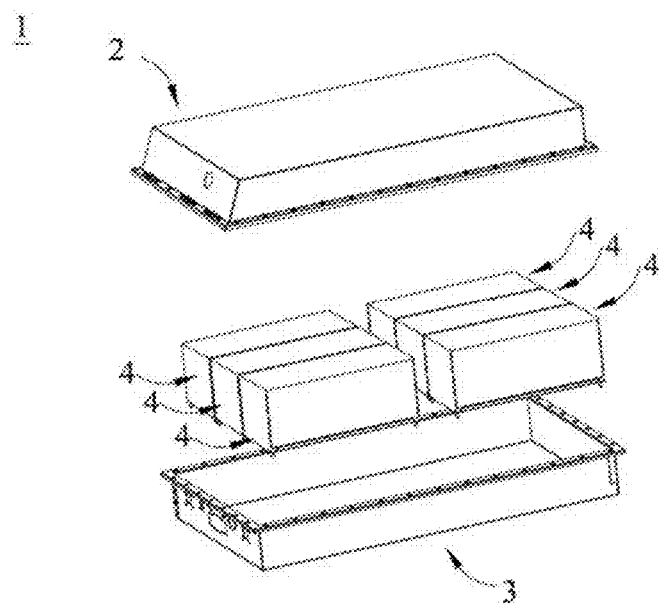
FIG. 6 is an exploded view of the battery pack shown in FIG. 5 according to an embodiment of this application.

FIG. 5 and FIG. 6 show a battery pack 1 as an example. Referring to FIG. 5 and FIG. 6, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

[Electrical Device]

Further, this application provides an electrical device. The electrical device includes at least one of the lithium-ion battery, the battery module, or the battery pack according to this application. The lithium-ion battery, the battery module, or the battery pack may be used as a power supply of the device, or used as an energy storage unit of the device. The device may be, but is not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The lithium-ion battery, the battery module, or the battery pack may be selected for the electrical device according to practical requirements.

Figure 7:
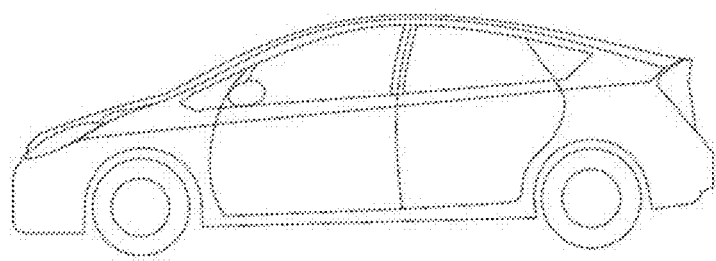
FIG. 7 is a schematic diagram of an electrical device according to an embodiment of this application.

FIG. 7 shows a device as an example. The device may be battery electric vehicle, a hybrid electric vehicle, a plug-in hybrid electric vehicle, or the like. To meet the requirements of the device for a high power and a high energy density of the lithium-ion battery, a battery pack or a battery module may be used for the device.

In another example, the device may be a mobile phone, a tablet computer, a notebook computer, or the like. The device is generally required to be thin and light, and may use a lithium-ion battery as a power supply.

EMBODIMENTS

The following describes embodiments of this application. The embodiments described below are exemplary, and are merely intended to construe this application but not to limit this application. In a case that no specific technique or condition is specified in an embodiment, the techniques or conditions described in the literature in this field or described in the instruction manual of the product may apply. A reagent or instrument used herein without specifying the manufacturer is a conventional product that is generally used in this field or commercially available in the market. Unless otherwise specified herein, the content of each ingredient in embodiments of this application is a fraction by mass.

Embodiment 1-1

[Preparing Carbon-Coated Lithium Iron Phosphate as a Positive Active Material]

Preparing a lithium iron phosphate substrate: Using iron phosphate, lithium carbonate, and titanium oxide as ingredients, mixing the iron phosphate, lithium carbonate, and titanium oxide at a stoichiometric molar ratio of $FePO_4$:$Li_2CO_3$:$TiO_2$=0.996:0.498:0.004, adding glucose and polyethylene glycol (the mass ratio between glucose and polyethylene glycol is 1:1) as a carbon source and a reductant (the dosage of the carbon source is 6% of the total mass of the ingredients), and then adding a water solvent to perform wet grinding to obtain a mixed slurry; spray-drying the obtained slurry, and then putting the dried product into a roller oven, sintering the product isolated from air at 500° C. for 20 hours, cooling naturally until the temperature of the material is lower than 80° C., and then taking out the calcined material; and pulverizing, sieving, and demagnetizing the calcined material to obtain a lithium iron phosphate substrate $LiFe_{0.998}Ti_{0.002}PO_4$ doped with carbon at a mass percent of approximately 0.3%.

Carbon coating: Putting the substrate into the roller oven for sintering in a nitrogen atmosphere, spraying an acetone solution as a carbon source in the sintering oven, and keeping sintering at a constant temperature of 770° C. for 10 hours. Taking out the material upon naturally cooling down to a temperature of less than 80° C., and further pulverizing the material with an airflow pulverizer to obtain the carbon-coated lithium iron phosphate in Embodiments 1-1.

[Positive Electrode Plate]

Mixing the carbon-coated lithium iron phosphate positive active material, the binder polyvinylidene difluoride (PVDF), and the conductive agent acetylene black at a mass ratio of 96.5:2.0:1.5, and adding an N-methylpyrrolidone (NMP) solvent to form a uniform positive slurry; spreading the slurry onto a carbon-coated aluminum foil 13 μm in thickness, with an areal density of coating being 26 mg/cm$^2$; and performing drying, cold pressing, and slitting to obtain the positive electrode plate in Embodiment 1-1 of this application.

[Negative Electrode Plate]

Mixing the negative active material graphite, the thickener sodium carboxymethyl cellulose, the binder styrene butadiene rubber, and the conductive agent acetylene black at a mass ratio of 97:1:1:1, and adding deionized water; stirring the mixture in a vacuum mixer to obtain a negative slurry; spreading the negative slurry evenly onto a copper foil 8 μm thick; drying the copper foil, and then performing cold pressing and slitting to obtain a negative electrode plate in Embodiment 1-1 of this application.

[Electrolytic Solution]

Mixing the solvent ethylene carbonate (EC) and dimethyl carbonate (DMC) at a mass ratio of 30:70, adding $LiPF_6$ after thorough dissolution, and then adding vinylene carbonate (VC) and fluoroethylene carbonate (FEC), mixing them uniformly to obtain an electrolytic solution in which the $LiPF_6$ concentration is 1 mol/L, and the mass percent of vinylene carbonate (VC) and the mass percent of fluoroethylene carbonate (FEC) each are 3%.

[Separator]

The separator is a polypropylene separator 12 μm thick.

[Preparing a Lithium-Ion Battery]

Drying the electrode plate in a 110° C. oven for 7 hours to dehydrate. Stacking the positive electrode plate, the separator, and the negative electrode plate in sequence so that the separator is located between the positive electrode plate and the negative electrode plate for isolation. Winding the stacked plates into a prismatic bare cell, and then packaging the bare cell into an aluminum plastic film. Injecting a corresponding nonaqueous electrolytic solution, performing sealing, and performing steps such as standing, hot and cold pressing, chemical formation, shaping, capacity grading to obtain the lithium-ion battery in Embodiment 1-1 of this application.

Embodiment 1-2

Identical to Embodiment 1-1 except that the temperature of constant-temperature sintering in the "carbon coating" step is 780° C.

Embodiment 1-3

Identical to Embodiment 1-1 except the "carbon coating" step.

The "carbon coating" step in Embodiment 1-3 is: Putting the lithium iron phosphate substrate in Embodiment 1-3 into a roller oven in a nitrogen atmosphere. Spraying an acetone solution while sintering the substrate at a constant temperature of 550° C. for 10 hours, and then cooling the material naturally until the temperature is less than 80° C. Taking out the material, pulverizing and sieving the material, and putting the material back into the roller oven. Spraying the acetone solution again while sintering the material at a constant temperature of 770° C. for 10 hours. Cooling the material naturally until the temperature is less than 80° C., and then taking out the material. Perform a jet milling process on the product sintered for a second time, so as to obtain the carbon-coated lithium iron phosphate in Embodiment 1-3.

Embodiment 1-4

Identical to Embodiment 1-3 except that the temperature of second-time constant-temperature sintering in the "carbon coating" step is 780° C.

Embodiment 1-5

Identical to Embodiment 1-3 except that the temperature of second-time constant-temperature sintering in the "carbon coating" step is 790° C.

Embodiment 1-6

Identical to Embodiment 1-3 except that the temperature of first-time constant-temperature sintering in the "carbon coating" step is 600° C. and the temperature of second-time constant-temperature sintering is 770° C.

Embodiment 1-7

Identical to Embodiment 1-6 except that the temperature of second-time constant-temperature sintering in the "carbon coating" step is 780° C.

Embodiment 1-8

Identical to Embodiment 1-6 except that the temperature of second-time constant-temperature sintering in the "carbon coating" step is 790° C.

Comparative Embodiment 1

Identical to Embodiment 1-1 except that the temperature of constant-temperature sintering in the "carbon coating" step is 750° C.

Comparative Embodiment 2

Conventional sintering: Using iron phosphate, lithium carbonate, and titanium oxide as ingredients, mixing the iron phosphate, lithium carbonate, and titanium oxide at a stoichiometric molar ratio of $FePO_4:Li_2CO_3:TiO_2=0.996:0.498:0.004$, adding glucose and polyethylene glycol (the mass ratio between glucose and polyethylene glycol is 1:1) as a carbon source (the dosage of the carbon source is 6% of the total mass of the ingredients), and then adding a water solvent to perform wet grinding to obtain a mixed slurry; spray-drying the obtained slurry, and then putting the dried product into a roller oven, sintering the product isolated from air at 750° C. for 10 hours, cooling naturally until the material temperature is lower than 80° C., and then taking out the calcined material; and pulverizing, sieving, and demagnetizing the calcined material to obtain the lithium iron phosphate in Comparative Embodiment 2.

Comparative Embodiment 3

Identical to Embodiment 1-6 except that the temperature of first-time constant-temperature sintering in the "carbon coating" step is 650° C. and the temperature of second-time constant-temperature sintering is 830° C.

Embodiment 2-1

Identical to Embodiment 1-1 except: the dosage of the carbon source in the step of "preparing a substrate" drops to 4% of the total mass of the ingredients, the temperature of constant-temperature sintering in the "carbon coating" step is 800° C., and the constant-temperature sintering time is 13 hours; and the substrate is doped with carbon at a mass percent of approximately 0.15%.

Embodiment 2-2

Identical to Embodiment 1-3 except: the dosage of the carbon source in the step of "preparing a substrate" drops to 5% of the total mass of the ingredients, the temperature of first-time constant-temperature sintering in the "carbon coating" step is 600° C., and the temperature of second-time constant-temperature sintering is 800° C.

Embodiment 2-3

Identical to Embodiment 2-2 except: the dosage of the carbon source in the step of "preparing a substrate" is 6% of the total mass of the ingredients, the temperature of first-time constant-temperature sintering in the "carbon coating" step is 600° C., and the temperature of second-time constant-temperature sintering is 780° C.

Embodiment 2-4

Identical to Embodiment 2-3 except: the dosage of the carbon source in the step of "preparing a substrate" is 7% of the total mass of the ingredients, the temperature of first-time constant-temperature sintering in the "carbon coating" step is 550° C., and the temperature of second-time constant-temperature sintering is 800° C.

Embodiment 2-5

Identical to Embodiment 2-4 except: the dosage of the carbon source in the step of "preparing a substrate" is 8% of the total mass of the ingredients, the temperature of first-time constant-temperature sintering in the "carbon coating" step is 550° C., and the temperature of second-time constant-temperature sintering is 780° C.

Comparative Embodiment 4

Identical to Embodiment 2-1 except: the dosage of the carbon source in the step of "preparing a substrate" drops to 3% of the total mass of the ingredients, the temperature of constant-temperature sintering is 830° C., and the constant-temperature sintering time is 15 hours.

Comparative Embodiment 5

Identical to Embodiment 2-5 except: the dosage of the carbon source in the step of "preparing a substrate" is 10% of the total mass of the ingredients, the temperature of first-time constant-temperature sintering in the "carbon coating" step is 550° C., and the temperature of second-time constant-temperature sintering is 770° C.

Comparative Embodiment 6

Identical to Comparative Embodiment 5 except that the dosage of the carbon source in the step of "preparing a substrate" is 15% of the total mass of the ingredients.

Embodiment 3-1

Identical to Embodiment 2-5 except: the dosage of the carbon source in the step of "preparing a substrate" is 5% of the total mass of the ingredients, the temperature of first-time constant-temperature sintering in the "carbon coating" step is 620° C. (the constant-temperature sintering time is 12 hours), and the temperature of second-time constant-temperature sintering is 820° C. (the constant-temperature sintering time is 12 hours).

Embodiment 3-2

Identical to Embodiment 3-1 except: the dosage of the carbon source in the step of "preparing a substrate" is 6% of the total mass of the ingredients, the temperature of first-time constant-temperature sintering in the "carbon coating" step is 600° C. (the constant-temperature sintering time is 10 hours), and the temperature of second-time constant-temperature sintering is 780° C. (the constant-temperature sintering time is 10 hours).

Embodiment 3-3

Identical to Embodiment 3-2 except: the dosage of the carbon source in the step of "preparing a substrate" is 8% of the total mass of the ingredients, the temperature of first-time constant-temperature sintering in the "carbon coating" step is 600° C. (the constant-temperature sintering time is 10 hours), and the temperature of second-time constant-temperature sintering is 780° C. (the constant-temperature sintering time is 10 hours).

Comparative Embodiment 7

Identical to Embodiment 3-1 except: the dosage of the carbon source in the step of "preparing a substrate" is 3% of the total mass of the ingredients, the temperature of first-time constant-temperature sintering in the "carbon coating" step is 650° C. (the constant-temperature sintering time is 10 hours), and the temperature of second-time constant-temperature sintering is 830° C. (the constant-temperature sintering time is 12 hours).

Comparative Embodiment 8

Identical to Comparative Embodiment 7 except: the dosage of the carbon source in the step of "preparing a substrate" is 12% of the total mass of the ingredients, the temperature of first-time constant-temperature sintering in the "carbon coating" step is 600° C. (the constant-temperature sintering time is 10 hours), and the temperature of second-time constant-temperature sintering is 780° C. (the constant-temperature sintering time is 10 hours).

Embodiment 4-1

Identical to Embodiment 2-3 except: the temperature of first-time constant-temperature sintering in the "carbon coating" step is 550° C. (the constant-temperature sintering time is 10 hours), and the temperature of second-time constant-temperature sintering is 790° C. (the constant-temperature sintering time is 15 hours). The volume median diameter $D_{v50}$ of the carbon-coated lithium iron phosphate positive active material ultimately obtained in Embodiment 4-1 is 530 nm.

Embodiments 4-2 to 4-7

The volume median diameter $D_{v50}$ of the carbon-coated lithium iron phosphate positive active material ultimately obtained is 840 nm, 1170 nm, 1430 nm, 1820 nm, 3520 nm, and 5070 nm, respectively. By adjusting the grading frequency of the jet mill, lithium iron phosphate positive active materials with different $D_{v50}$ values are obtained.

Comparative Embodiment 9

Identical to Embodiment 1-1 except that the temperature of constant-temperature sintering during the constant-temperature sintering is 750° C.

Embodiment 5-1

Identical to Embodiment 1-1 except: the dosage of the carbon source in the step of "preparing a substrate" is 8% of the total mass of the ingredients, the temperature of constant-temperature sintering in the "carbon coating" step is 750° C. (the constant-temperature sintering time is 10 hours).

Embodiment 5-2

Identical to Embodiment 2-2 except: the dosage of the carbon source in the step of "preparing a substrate" is 6% of the total mass of the ingredients, the temperature of first-time constant-temperature sintering in the "carbon coating" step is 550° C. (the constant-temperature sintering time is 10 hours), and the temperature of second-time constant-temperature sintering is 790° C. (the constant-temperature sintering time is 10 hours).

Embodiment 5-3

Identical to Embodiment 5-3 except: the dosage of the carbon source in the step of "preparing a substrate" is 5% of the total mass of the ingredients, the temperature of first-time constant-temperature sintering in the "carbon coating" step is 600° C. (the constant-temperature sintering time is 10 hours), and the temperature of second-time constant-temperature sintering is 830° C. (the constant-temperature sintering time is 14 hours).

Comparative Embodiment 10

The step of "preparing a substrate" is identical to that in Comparative Embodiment 7 except the "carbon coating" step. The specific step of "carbon coating" is as follows:

Putting the lithium iron phosphate substrate in Comparative Embodiment 10 into a roller oven in a nitrogen atmosphere. Spraying an acetone solution while sintering the substrate at a constant temperature of 600° C. for 10 hours. Cooling the material naturally until the temperature is less than 80° C., and then taking out the material. Pulverizing and sieving the material, and putting the material back into the roller oven again. Spraying the acetone solution again, and sintering the material at a constant temperature of 650° C. for 10 hours, and then cooling the material naturally until the temperature is less than 80° C. Taking out the material, pulverizing and sieving the material, and putting the material back into the roller oven. Spraying the acetone solution for a third time, and sintering the material at a constant temperature of 830° C. for 10 hours. Cooling the material naturally until the temperature is less than 80° C., and then taking out the material. Perform jet milling on the product sintered for a third time, so as to obtain the lithium iron phosphate positive active material in Comparative Embodiment 10.

Table 1 to Table 5 show detailed data such as specific surface area, volume median diameter $D_{v50}$, carbon content, electrode plate dehydration efficiency, powder compaction density, battery energy density, and battery cycle retention rate of the lithium iron phosphate positive active material in the foregoing embodiments and comparative embodiments.

Testing Relevant Parameters of Lithium Iron Phosphate Positive Active Material

1. Average Particle Diameter D

The X-ray powder diffractometer used in this application is X'pert PRO made in the United States. A detailed test process of the average particle diameter D is as follows:

1) Measuring the width Bm of a specimen. Setting a scanning speed of the instrument to 2 degrees per minute to obtain an XRD spectrum image of the specimen. Deducting a Cu Kα2 background with JADE software to obtain the Bm of each diffraction peak.

2) Measuring an instrumental broadening Bs.

Using a standard specimen that is made of the same substance as the specimen under test and that possesses a grain size of 5 to 20 μm. Measuring an XRD pattern of the standard specimen under the same experimental conditions as the specimen under test, and obtaining Bs from the pattern.

3) Calculating full width at half maximum B. B=Bm−Bs. (Note: The unit of the calculated B, if in angular degrees, needs to be converted into radians.)

4. Calculating the average particle diameter D. Using Scherrer formula D=Kλ/B cos θ, where K is 0.89, θ is a diffraction angle, and λ=0.154056 nm. Substituting B to obtain a grain thickness D' in a normal direction of a crystal plane represented by a single diffraction peak. Calculating D' for a plurality of diffraction peaks separately, and averaging out to obtain an average particle diameter D of the particles.

2. Scanning Electron Microscope (SEM)

Testing the lithium iron phosphate positive active materials of all embodiments and comparative embodiments with a ZEISS sigma 300 scanning electron microscope with reference to the standard JY/T010-1996, and observing the morphology of the specimens.

It is hereby pointed out that the shape of the lithium iron phosphate substrate according to this application is not necessarily a perfect spherical shape, but may be irregular, being primary particles. It is further pointed out that the shape of the carbon-coated lithium iron phosphate positive active material prepared according to this application is not necessarily a spherical shape, but may be irregular.

3. Transmission Electron Microscope (TEM)

Testing the lithium iron phosphate positive active materials of all embodiments and comparative embodiments with a JEOL2010 transmission electron microscope with reference to the standard GB/T 34002-2017.

4. Powder Compaction Density

Weighing out 1 gram of the lithium iron phosphate positive active material in each of the embodiments and comparative embodiments separately as a specimen. Putting the specimen into a cylindrical mold. A cross-sectional area of a circular hole of the mold is S. Applying a pressure of 3 tons to the powder in the mold, and keeping the pressure for 30 seconds. Recording the thickness of the powder as t. Therefore, the powder compaction density ρ of the lithium iron phosphate positive active material corresponding to each of the embodiments and comparative embodiments can be calculated by the following formula: ρ=m/(S×t).

5. Electrode Compaction Density

Cutting out a film 1000 mm in length from the electrode plate in each of the embodiments and comparative embodiments. Roll-compacting the electrode plate with a given pressure. Making the length of the film elongate to 1006 mm due to ductility of the aluminum foil. Subsequently, cutting out a small disc of 1540.25 mm² from the film by die-cutting, and measuring the weight M and thickness L of the small disc. Die-cutting pure aluminum foil into small discs of 1540.25 mm², and weighing the mass M0 of the blank aluminum foil. Therefore, the compaction density of the positive electrode plate corresponding to each of the embodiments and comparative embodiments can be calculated by the following formula:

$$PD=(M-M0)/1.54025/2/L.$$

6. Testing the Carbon Content

After the material is combusted in a high-frequency induction furnace, testing the carbon content of the positive active material in each of the embodiments and comparative embodiments according to an infrared absorption method by using a carbon sulfur analyzer such as Dekai HCS infrared carbon sulfur analyzer with reference to the standard GB/T 20123-2006/ISO 15350:2000 *Steel and Iron—Determination of Total Carbon and Sulfur Content—Infrared Absorption Method After Combustion in High-Frequency Induction Furnace.*

7. Testing the Specific Surface Area

Testing the relevant specific surface area parameters in the embodiments and comparative embodiments with a 3Flex specific surface area analyzer manufactured by Micromeritics. In this application, the specific surface area BET2 of the pore structures with a pore diameter of 0.5 nm to 100 nm is obtained by fitting in a T-Plot method, and reflects the sum of the surface areas of micropores, mesopores, and macropores in the lithium iron phosphate material, and BET1 is the specific surface area of mesopore and macropore structures ranging from 2.0 nm to 100 nm in diameter, as measured by the T-Plot method.

8. Powder Resistivity

Testing the powder resistivity of the positive active materials of all the foregoing embodiments and comparative embodiments based on the standard GB/T 30835-2014 using a powder resistivity tester (ST2722).

9. Electrode Plate Dehydration Efficiency

Mixing the lithium iron phosphate positive active material in each of the embodiments and comparative embodiments, the binder polyvinylidene difluoride (PVDF), and the conductive agent acetylene black at a mass ratio of 96.5:2.0:1.5, and adding an appropriate amount of N-methylpyrrolidone (NMP) solvent, and stirring well to form a uniform positive slurry; spreading the slurry onto a 13-μm-thickness carbon-coated aluminum foil of the positive current collector, with an areal density of coating being 26 mg/cm²; and performing drying, cold pressing, and slitting to obtain the positive electrode plate. Placing an electrode plate holder in an environment with a water content of 50%, leaving the electrode plate holder to stand for 24 hours to absorb water until approximate saturation. Punching the electrode plate with a punching device to obtain small discs 1.4 cm in diameter, and cutting the discs into small pieces of 0.5 cm×0.5 cm. Placing the pieces in a moisture tester to measure the water content, recorded as A ppm. Subsequently, sealing the remaining electrode plate in a plastic sealing bag to prevent hydration and dehydration of the electrode plate, and putting the sealed electrode plate in a vacuum oven to dry at 110° C. for 7 hours. Punching the dried electrode plate to obtain small discs in the same way, cutting the electrode plate into pieces, and measuring the water content, recorded as B ppm. The dehydration speed of the material is W=(A−B)/420 ppm/min.

10. Volume Median Diameter $D_{v50}$

In a group of particles, some particles with diameters greater than a D value account for 50% of the total volume, and the remaining particles with diameters smaller than the D value account for 50% of the total volume. Therefore, the D value is a volume median diameter of the particles.

Instrument model: Malvern 2000 (MasterSizer 2000) laser particle size analyzer; reference standard: GB/T19077-2016/ISO 13320:2009; detailed test process: taking an appropriate amount of lithium iron phosphate positive active material in the embodiments and comparative embodiments, adding 20 ml of deionized water (the concentration of specimen is not limited as long as a shading degree of 8% to 12% is ensured); ultrasonically dispersing the specimen for 5 minutes (53 KHz/120 W) to ensure that the specimen is thoroughly dispersed, and then testing the specimens in the embodiments and comparative embodiments separately with reference to the standard GB/T19077-2016/ISO 13320:2009; and plotting a volume-based particle size distribution curve and a number-based particle size distribution curve based on the test data. As can be seen from the curve, some particles with diameters greater than a D value account for 50% of the total volume, and remaining particles with diameters smaller than the D value account for 50% of the total volume. Therefore, the D value is a volume median diameter of the particles.

11. Graphitization Degree

Figure 8:
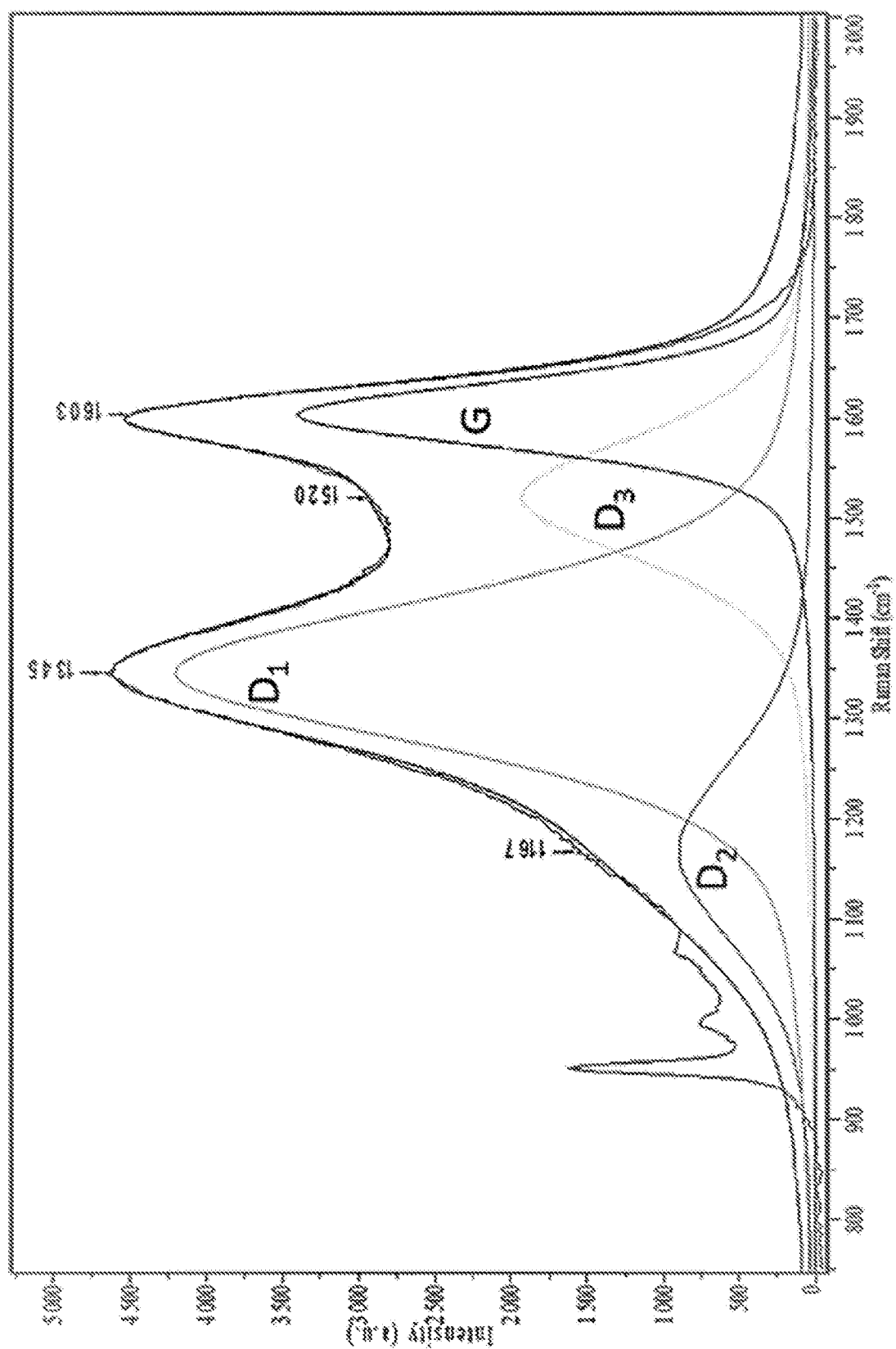
FIG. 8 shows the results of testing and characterizing the graphitization degree with a Raman spectrometer.

FIG. 8 shows the results of testing and characterizing the graphitization degree with a Raman spectrometer. The Raman spectrometer is a new-generation high-resolution Raman spectrometer manufactured by France-based HORIBA Jobin Yvon. The model is LabRAM HR Evolution, and the wavelength of the light source is 532 nm. Intercepting a pattern in the range of 750 to 2000 cm$^{-1}$, deducting the background, and then fitting by using the following Gaussian function. Ai, vi, and wi are peak intensity, peak position, and peak width, respectively. Two peaks corresponding to the carbon coating layer may be fitted by using four peaks. The corresponding peak intensities are denoted as D2, D1, D3, and G, respectively. Therefore, the graphitization degree is G/(D3+G).

$$G(v) = A_i \exp\left[-4\ln(2)\left(\frac{v - v_i}{w_i}\right)^2\right]$$

1. Method for Testing the Energy Density

Putting the lithium-ion batteries in the embodiments and comparative embodiments into a 25° C. oven, leaving batteries to stand for 2 hours, and performing charge-and-discharge tests. One charge-and-discharge cycle is as follows: charging a battery at a constant current of 1 C until the voltage reaches 3.65 V, and then charging the battery at a constant voltage until the charge current is less than 0.05 C; leaving the battery to stand for 5 minutes; discharging the battery at a constant current of 1 C current until the voltage reaches 2.0 V; and leaving the battery to stand for 5 minutes, thereby completing one charge-and-discharge cycle of the battery. Mass energy density of the battery cell (Wh/kg) =energy of the third-cycle discharge/mass of active material of lithium iron phosphate material in the battery.

2. Testing the Cycle Performance

Putting the lithium-ion batteries in the embodiments and comparative embodiments into a 60° C. oven, leaving batteries to stand for 2 hours, and performing charge-and-discharge tests. One charge-and-discharge cycle is as follows: charging a battery at a constant current of 1 C until the voltage reaches 3.65 V, and then charging the battery at a constant voltage until the charge current is less than 0.05 C; leaving the battery to stand for 5 minutes; discharging the battery at a constant current of 1 C current until the voltage reaches 2.5 V; and leaving the battery to stand for 5 minutes, thereby completing one charge-and-discharge cycle of the battery. Repeating the foregoing cycle until the battery capacity fades to 80% of the initial value, and recording the number of cycles.

TABLE 1

Relevant parameters of lithium-ion battery in embodiments and comparative embodiments

| | | Lithium iron phosphate positive active material | | | | Performance parameter | | |
| --- | --- | --- | --- | --- | --- | --- | --- | --- |
| Serial number | Carbon coating | Total carbon content (%) | BET1 (m²/g) | BET2 (m²/g) | η | Dehydration efficiency of positive electrode plate (ppm/min) | Cycle capacity retention rate (%) | Energy density (Wh/kg) |
| S1-1 | One-time carbon sputtering, 770° C., 10 h | 1.282 | 9.08 | 11.20 | 0.811 | 7.8 | 73.3 | ≥160 |
| S1-2 | One-time carbon sputtering, 780° C., 10 h | 1.216 | 8.86 | 10.60 | 0.836 | 8.5 | 76.4 | ≥170 |
| S1-3 | Two-time carbon sputtering, 550° C. + 770° C., 10 h each | 1.197 | 7.05 | 8.19 | 0.861 | 9.7 | 82.8 | ≥180 |
| S1-4 | Two-time carbon sputtering, 550° C. + +780° C., 10 h each | 1.056 | 6.68 | 7.48 | 0.893 | 10.9 | 84.6 | ≥180 |
| S1-5 | Two-time carbon sputtering, 550° C. + +790° C., 10 h each | 0.966 | 6.56 | 7.16 | 0.916 | 11.6 | 85.6 | ≥190 |

TABLE 1-continued

Relevant parameters of lithium-ion battery in embodiments and comparative embodiments

| | | Lithium iron phosphate positive active material | | | | Performance parameter | | |
|---|---|---|---|---|---|---|---|---|
| Serial number | Carbon coating | Total carbon content (%) | BET1 ($m^2/g$) | BET2 ($m^2/g$) | $\eta$ | Dehydration efficiency of positive electrode plate (ppm/min) | Cycle capacity retention rate (%) | Energy density (Wh/kg) |
| S1-6 | Two-time carbon sputtering, 600° C. + 770° C., 10 h each | 0.903 | 6.46 | 7.01 | 0.922 | 12.1 | 83.6 | ≥190 |
| S1-7 | Two-time carbon sputtering, 600° C. + +780° C., 10 h each | 0.734 | 5.95 | 6.40 | 0.929 | 12.9 | 87.3 | ≥180 |
| S1-8 | Two-time carbon sputtering, 600° C. + +790° C., 10 h each | 0.654 | 5.82 | 6.20 | 0.939 | 13.5 | 81.0 | ≥170 |
| D1 | One-time carbon sputtering, 750° C., 10 h | 1.282 | 9.38 | 11.80 | 0.795 | 7.5 | 80.1 | ≥170 |
| D2 | Conventional sintering, no carbon coating | 1.271 | 9.86 | 12.80 | 0.770 | 6.8 | 82.5 | ≥190 |
| D3 | Two-time carbon sputtering, 650° C. + 830° C., 10 h each | 0.582 | 4.84 | 5.01 | 0.966 | 15.5 | 72.1 | ≥150 |

TABLE 2

Relevant parameters of lithium-ion battery in embodiments and comparative embodiments

| | Means of treatment | | Lithium iron phosphate positive active material | | | | Performance parameter | | |
|---|---|---|---|---|---|---|---|---|---|
| Serial number | Dosage of carbon source in substrate preparation (%) | Main technical parameters of carbon coating | Total carbon content (%) | BET1 ($m^2/g$) | BET2 ($m^2/g$) | $\eta$ | Dehydration efficiency of positive electrode plate (ppm/min) | Cycle capacity retention rate (%) | Energy density (Wh/kg) |
| S2-1 | 4% | One-time carbon sputtering, 800° C., 13 h | 0.70 | 5.87 | 6.24 | 0.940 | 12.2 | 85.5 | ≥160 |
| S2-2 | 5% | Two-time carbon sputtering, 600° C. + +800° C., 10 h each | 0.82 | 6.11 | 6.62 | 0.923 | 11.7 | 84.1 | ≥170 |
| S2-3 | 6% | Two-time carbon sputtering, 600° C. + +780° C., 10 h each | 0.95 | 7.23 | 8.02 | 0.901 | 10.5 | 84.8 | ≥190 |
| S2-4 | 7% | Two-time carbon sputtering, 550° C. + +800° C., 10 h each | 1.12 | 6.99 | 7.97 | 0.877 | 10.2 | 86.0 | ≥190 |
| S2-5 | 8% | Two-time carbon sputtering, 550° C. + +780° C., 10 h each | 1.30 | 8.81 | 10.75 | 0.819 | 8.3 | 85.6 | ≥180 |
| D4 | 3% | One-time carbon sputtering, 830° C., 15 h | 0.55 | 5.12 | 5.28 | 0.970 | 14.6 | 71.7 | ≥150 |
| D5 | 10% | Two-time carbon sputtering, 550° C. + 770° C., 10 h each | 1.60 | 12.50 | 16.50 | 0.758 | 5.4 | 75.5 | ≥170 |
| D6 | 15% | Two-time carbon sputtering, 550° C. + 770° C., 10 h each | 2.00 | 13.50 | 19.30 | 0.700 | 3.6 | 70.1 | ≥150 |

TABLE 3

Relevant parameters of lithium-ion battery in embodiments and comparative embodiments

| | | Lithium iron phosphate positive active material | | | | | | Performance parameter | | |
|---|---|---|---|---|---|---|---|---|---|---|
| Serial number | Main technical parameters of carbon coating | Total carbon content (%) | Thickness of carbon coating layer (nm) | Average particle diameter D (nm) | H/D ratio value | BET1 ($m^2/g$) | BET2 ($m^2/g$) | $\eta$ | Dehydration efficiency of electrode plate (ppm/min) | Cycle capacity retention rate (%) | Energy density (Wh/kg) |
| D7 | Two-time carbon sputtering, 650° C. + 830° C., 10 h + 12 h | 0.65 | 4.1 | 490 | 0.008 | 4.95 | 5.07 | 0.976 | 15.3 | 69.8 | ≥150 |
| S3-1 | Two-time carbon sputtering, 620° C. + 820° C., 12 + 12 h | 0.83 | 5.2 | 365 | 0.014 | 5.88 | 6.26 | 0.939 | 12.4 | 78.7 | ≥170 |

TABLE 3-continued

Relevant parameters of lithium-ion battery in embodiments and comparative embodiments

| Serial number | Main technical parameters of carbon coating | Total carbon content (%) | Thickness of carbon coating layer (nm) | Average particle diameter D (nm) | H/D ratio value | BET1 ($m^2/g$) | BET2 ($m^2/g$) | η | Dehydration efficiency of electrode plate (ppm/min) | Cycle capacity retention rate (%) | Energy density (Wh/kg) |
|---|---|---|---|---|---|---|---|---|---|---|---|
| S3-2 | Two-time carbon sputtering, 600° C. + 780° C., 10 h + 10 h | 0.916 | 6.2 | 234 | 0.026 | 6.93 | 7.57 | 0.915 | 11.6 | 85.6 | ≥190 |
| S3-3 | Two-time carbon sputtering, 600° C. + 780° C., 10 h + 10 h | 1.56 | 7.7 | 211 | 0.036 | 8.58 | 10.43 | 0.822 | 8.1 | 83.2 | ≥180 |
| D8 | Two-time carbon sputtering, 600° C. + 780° C., 10 h + 10 h | 2.0 | 8.9 | 185 | 0.056 | 13.0 | 16.8 | 0.774 | 5.2 | 73.9 | ≥160 |

TABLE 4

Relevant parameters of lithium-ion battery in embodiments and comparative embodiments

| Serial number | Means of treatment | Total carbon content (%) | Volume median diameter $D_{v50}$ (nm) | BET1 ($m^2/g$) | BET2 ($m^2/g$) | η | Dehydration efficiency of electrode plate (ppm/min) | Cycle capacity retention rate (%) | Powder compaction density (g/cm³) | Electrode compaction density (g/cm³) | Energy density (Wh/kg) |
|---|---|---|---|---|---|---|---|---|---|---|---|
| S4-1 | Dosage of carbon source in substrate preparation is 6%. Two-time carbon sputtering, 550° C. + 790° C., 10 h + 15 h | 0.90 | 530 | 9.09 | 11.18 | 0.813 | 7.4 | 82.9 | 2.64 | 2.65 | ≥190 |
| S4-2 | | | 840 | 8.06 | 9.95 | 0.810 | 8.7 | 84.3 | 2.61 | 2.64 | ≥190 |
| S4-3 | | | 1170 | 7.28 | 8.01 | 0.909 | 8.8 | 85.3 | 2.57 | 2.62 | ≥190 |
| S4-4 | | | 1430 | 6.66 | 7.28 | 0.915 | 11.6 | 85.6 | 2.55 | 2.60 | ≥190 |
| S4-5 | | | 1820 | 6.04 | 6.55 | 0.922 | 12.4 | 85.9 | 2.47 | 2.49 | ≥180 |
| S4-6 | | | 3520 | 5.18 | 5.58 | 0.928 | 14.4 | 87.8 | 2.40 | 2.35 | ≥170 |
| S4-7 | | | 5070 | 4.56 | 4.89 | 0.933 | 15.1 | 88.7 | 2.35 | 2.32 | ≥170 |

TABLE 5

Relevant parameters of lithium-ion battery in embodiments and comparative embodiments

| Serial number | Means of carbon coating | Total carbon content (%) | Graphitization degree | BET1 ($m^2/g$) | BET2 ($m^2/g$) | η | Powder resistivity (Ω·m) | Dehydration efficiency of electrode plate (ppm/min) | Cycle capacity retention rate (%) | Energy density (Wh/kg) |
|---|---|---|---|---|---|---|---|---|---|---|
| D9 | Conventional sintering, no carbon coating | 1.46 | 0.097 | 11.86 | 16.7 | 0.710 | 33.2 | 5.3 | 70.2 | ≥160 |
| S5-1 | One-time carbon sputtering, 750° C., 10 h | 1.40 | 0.155 | 9.58 | 12.6 | 0.760 | 11.1 | 7.1 | 78.2 | ≥170 |
| S5-2 | Two-time carbon sputtering, 550° C. + 790° C., 10 h + 10 h | 0.95 | 0.255 | 6.63 | 7.25 | 0.914 | 18.5 | 10.6 | 85.6 | ≥190 |
| S5-3 | Two-time carbon sputtering, 600° C. + 830° C., 10 h + 14 h | 0.89 | 0.300 | 6.17 | 6.55 | 0.942 | 9.8 | 11.9 | 80.1 | ≥180 |
| D10 | Three-time carbon sputtering, 600° C. + 650° C. + 830° C., 10 h + 10 h + 10 h | 0.82 | 0.437 | 5.88 | 6.00 | 0.979 | 3.5 | 13.9 | 77.3 | ≥170 |

As can be seen from comprehensive comparison between embodiments S1-1 to S1-8 and comparative embodiments D1 to D3 in Table 1, when η is 0.81 to 0.95 (S1-1 to S1-8), the electrode plate dehydration rate is significantly superior to that in comparative embodiments D1 to D3 on the whole, and the corresponding lithium-ion batteries achieve an excellent cycle capacity retention rate and a relatively high energy density concurrently. Further, when η is 0.82 to 0.93 (S1-2 to S1-7), the corresponding electrode plate dehydration rate is even higher, and the cycle performance and energy density of the corresponding lithium-ion batteries are even higher. Further, when η is 0.88 to 0.92 (S1-4 to S1-6), the corresponding electrode plate dehydration rate is further higher, the cycle performance and energy density of the corresponding lithium-ion batteries are further higher, and the overall performance of the lithium-ion batteries is excellent. However, none of the comparative embodiments D1~D3 achieves a superior electrode plate dehydration rate, a relatively high cycle capacity retention rate, and a relatively high energy density concurrently.

As can be seen from comprehensive comparison between embodiments S2-1 to S2-5 and comparative embodiments D4 to D6 in Table 2, when η is 0.81 to 0.95 and the carbon content is 0.82% to 1.3%, the lithium-ion battery achieves a superior electrode plate dehydration rate, an excellent cycle capacity retention rate, and a relatively high energy density concurrently. Further, when the carbon content is 0.9% to 1.3%, the corresponding electrode plate dehydration rate is even higher, and the cycle performance and energy density of the corresponding lithium-ion batteries are even higher. Further, when the carbon content is 0.9%-1.1%, the corresponding electrode plate dehydration rate is further higher, the cycle performance and energy density of the corresponding lithium-ion batteries are further higher, and the overall performance of the lithium-ion batteries is more excellent. However, none of the comparative embodiments D4~D6 achieves a superior electrode plate dehydration rate, a relatively high cycle capacity retention rate, and a relatively high energy density concurrently.

As can be seen from comprehensive comparison between embodiments S3-1 to S3-3 and comparative embodiments D7 to D8 in Table 3, when η is 0.81 to 0.95 and the HID ratio is 0.01 to 0.04, the lithium-ion battery achieves a superior electrode plate dehydration rate, an excellent cycle capacity retention rate, and a relatively high energy density concurrently. However, none of the comparative embodiments D7~D8 achieves a superior electrode plate dehydration rate, a relatively high cycle capacity retention rate, and a relatively high energy density concurrently.

As can be seen from comprehensive comparison between embodiments S4-1 to S4-7 in Table 4, when η is 0.81 to 0.95 and $D_{v50}$ is 530 nm to 5070 nm, the lithium-ion battery achieves a superior electrode plate dehydration rate, an excellent cycle capacity retention rate, and a relatively high energy density concurrently. Further, when $D_{v50}$ is 1170 nm to 1820 nm, the corresponding electrode plate dehydration rate is even higher, and the cycle performance and energy density of the corresponding lithium-ion batteries are even higher, and the overall performance of the lithium-ion batteries is more excellent.

As can be seen from comprehensive comparison between embodiments S5-1 to S5-3 and comparative embodiments D9 to D10 in Table 5, when the graphitization degree of the positive active material is 0.15 to 0.32, the lithium-ion battery achieves a superior electrode plate dehydration rate, an excellent cycle capacity retention rate, and a relatively high energy density concurrently. Further, when the graphitization degree of the carbon coating layer 0.19 to 0.26, the corresponding electrode plate dehydration rate is even higher, the cycle performance and energy density of the corresponding lithium-ion batteries are even higher, and the overall performance of the lithium-ion batteries is more excellent. However, none of the comparative embodiments D9~D10 achieves a superior electrode plate dehydration rate, a relatively high cycle capacity retention rate, and a relatively high energy density concurrently.

It is hereby noted that this application is not limited to the foregoing embodiments. The foregoing embodiments are merely for illustrative purposes. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A carbon-coated lithium iron phosphate positive active material, comprising:
   a lithium iron phosphate substrate and a carbon coating layer on a surface of the substrate, the lithium iron phosphate substrate having a general structural formula $LiFe_{1-a}M_aPO_4$, wherein M is at least one selected from Cu, Mn, Cr, Zn, Pb, Ca, Co, Ni, Sr, Nb, or Ti, and $0 \leq a \leq 0.01$;
   wherein a carbon coating factor of the carbon-coated lithium iron phosphate material is $$\eta = \frac{BET1}{BET2},$$

wherein BET1 denotes a specific surface area of mesopore and macropore structures in the carbon-coated lithium iron phosphate, BET2 denotes a total specific surface area of the carbon-coated lithium iron phosphate, and η satisfies $0.81 \leq \eta \leq 0.95$.

2. The positive active material according to claim 1, wherein:
   η satisfies $0.85 \leq \eta \leq 0.93$.

3. The positive active material according to claim 1, wherein:
   a value range of BET1 is 5.5 to 9.5 m²/g, and a value range of BET2 is 6.0 to 11.5 m²/g.

4. The positive active material according to claim 1, wherein:
   a carbon component accounts for 0.7% to 1.3% of a total mass of the carbon-coated lithium iron phosphate.

5. The positive active material according to claim 1, wherein:
   a ratio H/D of a thickness H of the carbon coating layer to an average particle diameter D of the carbon-coated lithium iron phosphate is 0.01 to 0.04.

6. The positive active material according to claim 1, wherein:
   a volume median diameter $D_{v50}$ of the carbon-coated lithium iron phosphate satisfies $840 \text{ nm} \leq D_{v50} \leq 3570 \text{ nm}$.

7. The positive active material according to claim 1, wherein a powder compaction density of the carbon-coated lithium iron phosphate is at least 2.4 g/cm³.

8. The positive active material according to claim 1, wherein:
   a graphitization degree of the carbon-coated lithium iron phosphate is 0.15 to 0.32.

9. The positive active material according to claim 1, wherein:
   a powder resistivity of the carbon-coated lithium iron phosphate is not greater than 60 Ω·m.

10. The positive active material according to claim 1, wherein the lithium iron phosphate substrate is doped with 0.1 wt % to 0.5 wt % carbon based on a mass of the lithium iron phosphate substrate.

11. A method for manufacturing the positive active material according to claim 1, comprising:
providing the lithium iron phosphate substrate; and
performing carbon coating on the lithium iron phosphate substrate to obtain the carbon-coated lithium iron phosphate positive active material;
wherein:
the positive active material comprises the lithium iron phosphate substrate and the carbon coating layer located on the surface of the substrate, the lithium iron phosphate substrate has a general structural formula $LiFe_{1-a}M_aPO_4$, wherein M is at least one selected from Cu, Mn, Cr, Zn, Pb, Ca, Co, Ni, Sr, Nb, or Ti, and $0 \leq a \leq 0.01$; and
the carbon coating factor of the carbon-coated lithium iron phosphate material is $$\eta = \frac{BET1}{BET2},$$

wherein BET1 denotes a specific surface area of mesopore and macropore structures in the carbon-coated lithium iron phosphate, and BET2 denotes a total specific surface area of the carbon-coated lithium iron phosphate, and $\eta$ satisfies $0.81 \leq \eta \leq 0.95$.

12. The method according to claim 11, wherein the lithium iron phosphate substrate is doped with 0.1 wt % to 0.5 wt % carbon based on a mass of the lithium iron phosphate substrate.

13. A positive electrode plate of a lithium-ion battery, comprising:
a positive current collector; and
a positive active material disposed on at least one surface of the positive current collector, wherein the positive active material is the positive active material according to claim 1.

14. The positive electrode plate according to claim 13, wherein a saturated water content of the positive electrode plate at 25° C. and a relative humidity of 45% is not greater than 500 ppm.

15. A lithium-ion battery, comprising:
a positive electrode plate; and
a negative electrode plate;
wherein the positive electrode plate comprises a positive current collector and a positive active material disposed on at least one surface of the positive current collector, wherein the positive active material is the positive active material according to claim 1.

16. The lithium-ion battery according to claim 15, wherein:
an electrode compaction density of the positive electrode plate is at least 2.35 g/cm$^3$;
an electrode compaction density of the negative electrode plate is at least 1.6 g/cm$^3$; and
a negative active material of the negative electrode plate is graphite coated with amorphous carbon.

17. A battery module, comprising the lithium-ion battery according to claim 15.

18. A battery pack, comprising the lithium-ion battery according to claim 15.

19. An electrical device, comprising the lithium-ion battery according to claim 15, wherein the lithium-ion battery is used as a power supply of the electrical device or an energy storage unit of the electrical device.

* * * * *